US010782073B2

(12) United States Patent
Robbers et al.

(10) Patent No.: US 10,782,073 B2
(45) Date of Patent: Sep. 22, 2020

(54) WASTE HEAT BOILER SYSTEM, MIXING CHAMBER, AND METHOD FOR COOLING A PROCESS GAS

(71) Applicant: Technip France, Courbevoie (FR)

(72) Inventors: Jacobus Robbers, Courbevoie (FR); Ivan Radosevic, Courbevoie (FR); Hendrik Arie De Vrij, Courbevoie (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/554,097

(22) PCT Filed: Feb. 26, 2016

(86) PCT No.: PCT/EP2016/054102
§ 371 (c)(1),
(2) Date: Aug. 28, 2017

(87) PCT Pub. No.: WO2016/135299
PCT Pub. Date: Sep. 1, 2016

(65) Prior Publication Data
US 2018/0045468 A1    Feb. 15, 2018

(30) Foreign Application Priority Data

Feb. 27, 2015  (EP) .................................... 15156873

(51) Int. Cl.
*F28D 7/16*       (2006.01)
*B01F 5/04*       (2006.01)
(Continued)

(52) U.S. Cl.
CPC .............. *F28D 7/1676* (2013.01); *B01F 3/02* (2013.01); *B01F 5/045* (2013.01); *F22B 1/18* (2013.01);
(Continued)

(58) Field of Classification Search
CPC ..................................................... F28D 7/1676
See application file for complete search history.

(56) References Cited

U.S. PATENT DOCUMENTS 192,165 A  *  6/1877  Hind ............................... 122/47
410,351 A  *  9/1889  Davidson .................. F22B 7/12
                                                                        122/83
(Continued)

FOREIGN PATENT DOCUMENTS

CN         104285117 A      1/2015
CN         204187592 U      3/2015
(Continued)

OTHER PUBLICATIONS

European Search Report dated Nov. 27, 2015 in corresponding European Patent Application No. EP 15 15 6873 (1 page).
(Continued)

Primary Examiner — Nathaniel Herzfeld
(74) Attorney, Agent, or Firm — Ostrolenk Faber LLP

(57) ABSTRACT

A waste heat boiler system for cooling a process gas, including a first shell-and-tube heat exchanger for cooling relatively hot gas down to relatively warm gas, an intermediate chamber for receiving gas, cooled down to relatively warm gas, coming out of tubes of the first heat exchanger, and a second shell-and-tube heat exchanger for cooling relatively warm gas further down to relatively cool gas. The intermediate chamber is provided with an outlet fluidly connected to a bypass channel for allowing a part of the relatively warm gas to bypass tubes of the second heat exchanger. The bypass channel and tubes of the second heat exchanger are both fluidly connected with a mixing chamber for mixing together relatively warm gas flowed from the intermediate chamber into the mixing chamber via the
(Continued)

bypass channel and relatively cool gas come out of the tubes of the second heat exchanger.

20 Claims, 3 Drawing Sheets

(51) Int. Cl.
  F22B 9/12 (2006.01)
  F22B 37/06 (2006.01)
  F28D 7/00 (2006.01)
  F28D 21/00 (2006.01)
  B01F 3/02 (2006.01)
  F22B 1/18 (2006.01)
  F22B 15/00 (2006.01)

(52) U.S. Cl.
  CPC ............... *F22B 9/12* (2013.01); *F22B 15/00* (2013.01); *F22B 37/06* (2013.01); *F28D 7/0066* (2013.01); *F28D 7/16* (2013.01); *F28D 21/0003* (2013.01); *B01F 3/026* (2013.01); *F28F 2250/06* (2013.01)

(56) References Cited

U.S. PATENT DOCUMENTS

| | | | | |
|---|---|---|---|---|
| 1,132,778 | A | | 3/1915 | Kerner |
| 1,488,359 | A | * | 3/1924 | Lopez ..................... F23B 7/00 |
| | | | | 105/43 |
| 1,634,020 | A | * | 6/1927 | Crowell ................... F22B 9/12 |
| | | | | 122/42 |
| 1,918,966 | A | | 7/1933 | Harkness |
| 2,595,252 | A | * | 5/1952 | Haug ..................... C10J 1/213 |
| | | | | 48/205 |
| 3,463,125 | A | * | 8/1969 | Voorheis ................ F22B 33/08 |
| | | | | 122/406.1 |
| 4,314,606 | A | * | 2/1982 | Muller .................... B01F 5/061 |
| | | | | 165/163 |
| 4,643,747 | A | * | 2/1987 | Becker .................... F22B 9/12 |
| | | | | 122/492 |
| 4,907,643 | A | * | 3/1990 | Grotz .................... B01J 8/0285 |
| | | | | 165/134.1 |
| 4,993,367 | A | | 2/1991 | Kehrer ......................... 122/7 R |
| 5,437,248 | A | * | 8/1995 | Miura ...................... F22B 9/12 |
| | | | | 122/18.31 |
| 5,452,686 | A | | 9/1995 | Stahl |
| 2002/0148913 | A1 | | 10/2002 | Horn .............................. 239/430 |
| 2007/0125317 | A1 | * | 6/2007 | Jekerle ..................... F28D 7/16 |
| | | | | 122/7 R |
| 2009/0038302 | A1 | * | 2/2009 | Yamada ................ F01N 3/0205 |
| | | | | 60/320 |
| 2012/0137989 | A1 | * | 6/2012 | Van Wyk .................. F22B 9/12 |
| | | | | 122/236 |
| 2013/0180475 | A1 | * | 7/2013 | Christiansen ............ F22B 1/18 |
| | | | | 122/7 R |
| 2014/0000845 | A1 | * | 1/2014 | Vanderwees ............ F28F 27/00 |
| | | | | 165/83 |
| 2014/0311141 | A1 | * | 10/2014 | Mori ........................ F02G 5/00 |
| | | | | 60/599 |

FOREIGN PATENT DOCUMENTS

| | | |
|---|---|---|
| DE | 29 43 649 A1 | 5/1980 |
| DE | 44 30 648 A1 | 3/1996 |
| EP | 1 498 678 A1 | 1/2005 |
| EP | 2 312 252 A1 | 4/2011 |
| GB | 1 484 489 | 9/1977 |
| WO | WO 2012/041344 A1 | 4/2012 |
| WO | WO 2013/137180 A1 | 11/2013 |
| WO | WO 2013/167180 A1 | 11/2013 |

OTHER PUBLICATIONS

International Search Report dated May 13, 2016 in corresponding PCT International Application No. PCT/EP2016/054102.
Written Opinion dated May 13, 2016 in corresponding PCT International Application No. PCT/EP2016/054102.

* cited by examiner

WASTE HEAT BOILER SYSTEM, MIXING CHAMBER, AND METHOD FOR COOLING A PROCESS GAS

CROSS-REFERENCE TO RELATED APPLICATIONS

The present application is a 35 U.S.C. §§ 371 national phase conversion of PCT/EP2016/054102, filed Feb. 26, 2016, which claims priority to European Patent Application No. 15156873.0, filed Feb. 27, 2015, the contents of which are incorporated herein by reference. The PCT International Application was published in the English language.

TECHNICAL FIELD

The invention relates to a waste heat boiler system for cooling a process gas.

BACKGROUND OF THE INVENTION

Waste heat boiler systems are known and are commonly used for cooling process gas, for example in plants that produce hydrogen or syngas, e.g. for industrial hydrogen production, methanol production, ammonia production, dimethyl ether production, etc. Usually, the process gas to be cooled originates from for instance a steam reformer, an autothermal reformer, a regenerative reformer, or a partial oxidation unit. The process gas passing through the waste heat boiler system is generally fed to the waste heat boiler system at a relatively high temperature, e.g. higher than 500° C., usually above 650° C., commonly even at or above 700° C., such as for instance at a temperature between 700° C. and 1,000° C. The process gas passing through the waste heat boiler system is generally fed to the waste heat boiler system at a relatively high pressure, e.g. between 5 and 60 bar, commonly between 10 and 50 bar, such as between 20 and 35 bar.

The cooling medium used in waste heat boilers is usually water that is evaporated at contact of a surface that acts as physical boundary between the said water and the said process gas. For the applications described above the pressure of water side is usually pressurized to pressure comprised between 10 and 150 bar, more typically between 20 and 120 bar, such as between 35 and 70 bar.

The pressure difference between the process gas side and the water side is above 5 bar, usually above 10 bar and even above 25 bar in systems where the steam quality needs to be high (typically for ammonia and hydrogen plants).

Said process gas usually needs to be cooled down to a relatively low temperature of 400° C. or less, especially a temperature of less than 350° C., for instance for further downstream treatment of the gas, e.g. catalytic treatment, especially water gas shift treatment, separation by membranes, by scrubbing or by pressure swing adsorption. For example in order to facilitate safe and proper operation of downstream units suitable for such further downstream treatment of gas, known waste heat boiler systems are generally arranged to control the temperature of the relatively cool gas which is output by such known waste heat boiler system, such that said output gas can be of a predetermined temperature and/or in a predetermined temperature range.

For example, a waste heat boiler system is known which comprises a shell-and-tube heat exchanger for cooling relatively hot process gas having a temperature between 500° C. and 1,000° C. down to a relatively cool gas having a temperature less than 350° C. by allowing the process gas to flow through tubes of said shell-and-tube heat exchanger, which tubes extend through a space within a shell of said shell-and-tube heat exchanger, through which space water is fed in order to cool said gas. Practical experience has shown that it can be almost impossible to control the temperature of the relatively cool gas output by the shell-and-tube heat exchanger. Thereto, such a known waste heat boiler system often comprises a bypass channel for allowing a portion of the relatively hot gas to bypass the heat exchanger, see e.g. publications EP 1 498 678, EP 2 312 252, U.S. Pat. No. 4,993,367, and US 2007/0 125 317 each of which publications discloses a central bypass channel extending through a center of the shell-and-tube heat exchanger. Such known waste heat boiler systems further comprise a mixing chamber to mix said small amount of bypassed relatively hot process gas with the cooled down process gas come out of the heat exchanger. In order to control the temperature of the mixed, relatively cool gas to be fed from the waste heat boiler system to a downstream unit for gas treatment, such known waste heat boiler system further comprises a control system having a control valve to control the amount of bypassed relatively hot process gas.

However, a problem associated with such a prior art waste heat boiler system is that it suffers from corrosion issues due to the mixing of relatively hot bypassed gas with cooled process gas, which, as mentioned above, is carried out for the sake of outlet temperature control. The temperature of the hot bypassed gas is usually in the range of 500° C.-1,000° C., at which temperatures metal dusting or carburization corrosion occurs relatively easily. As a consequence, the prior art waste heat exchanger, especially its mixing chamber, its control valve, its control means for controlling its control valve, or other waste heat boiler system components, especially components located at or near the place where the mixing occurs, can be relatively prone to corrosion. This may for instance lead to jamming of the control valve. As a result of relatively severe corrosion, especially metal dusting, the prior art waste heat boiler systems are relatively wearable and/or can even be or become unreliable.

SUMMARY OF THE INVENTION

It is an object of the invention to provide an alternative waste heat boiler system. In particular, it can be an object of the invention to provide a waste heat boiler system wherein at least one of the disadvantages of the prior art waste heat boiler system is counteracted. More in particular, the invention may aim to provide a waste heat boiler system, especially a waste heat boiler system comprising a shell-and-tube heat exchanger, wherein at least one of the disadvantages mentioned above is counteracted. In embodiments, the invention aims at providing a waste heat boiler system for cooling a relatively hot gas, of e.g. 500° C.-1,000° C. or 700° C.-1,000° C. down to a relatively cool gas, wherein at the one hand the temperature of relatively cool output gas, of e.g. 400° C., preferably 350° C. or less, can be controlled relatively well, and wherein at the other hand the waste heat boiler system is relatively wear-resistant, e.g. relatively insusceptible to metal dusting.

Thereto, the present disclosure provides for a waste heat boiler system for cooling a process gas, comprising a first shell-and-tube heat exchanger for cooling relatively hot gas down to relatively warm gas by allowing gas to flow through tubes of said first heat exchanger, which tubes extend through a space within a shell of said first heat exchanger, said waste heat boiler system also comprising an intermediate chamber for receiving gas, cooled down to relatively warm gas, coming out of the tubes of the first heat exchanger, said waste heat boiler system further comprising a second shell-and-tube heat exchanger for cooling relatively warm gas further down to relatively cool gas by allowing gas to flow from the intermediate chamber and through tubes of the second heat exchanger, which tubes extend through a space within a shell of said second heat exchanger, wherein the intermediate chamber is provided with an outlet fluidly connected to a bypass channel for allowing a part of the relatively warm gas entering said intermediate chamber from the tubes of the first heat exchanger to bypass the tubes of the second shell-and-tube heat exchanger, wherein both the bypass channel and the tubes of the second shell-and-tube heat exchanger are in fluid connection with a mixing chamber for mixing together relatively warm gas flowed from the intermediate chamber into the mixing chamber via the bypass channel and relatively cool gas come out of the tubes of the second shell-and-tube heat exchanger.

By using at least two heat exchangers to cool down the relatively hot gas, e.g. of 500° C.-1.000° C., down to a relatively cool gas, e.g. of 350° C. or less, in a stepwise manner, and by drawing of a portion of the gas semi-cooled down to a relatively warm gas, e.g. of 350° C.-500° C., and letting said portion bypass the second heat exchanger, the waste heat boiler system can mix relatively cool gas, e.g. of 350° C. or less, with pre-cooled, still relatively warm gas, e.g. of 350° C.-500° C. Hence, the waste heat boiler system can mix two relatively mild temperature gasses, each having a relatively mild temperature, e.g. each having a temperature below 500° C. Accordingly, a system can be provided that uses exclusively process gas streams at relatively mild temperatures, e.g. at or below 500° C., for outlet gas temperature control. Therefore, it can thus be facilitated that the mixing chamber of the waste heat boiler system does not receive any gas having a relatively high temperature, e.g. above 500° C. As a result, the mixing chamber can be less prone to metal dusting and less prone to mixing chamber failure, as a result of which the waste heat boiler system can be relatively wear-resistant and/or relatively reliable.

Advantageously, the bypass channel can be provided with a control valve for controlling the flow of relatively warm gas bypassing the tubes of the second heat exchanger. Hence, the flow of relatively warm gas, e.g. of 350° C.-500° C., fed to the mixing chamber can be controlled in order to control the output temperature of the mixed gas leaving the mixing chamber. By providing the control valve at the bypass channel, it can be counteracted that the control valve is subject to relatively hot gas. As a result, control valve failure, e.g. due to metal dusting of the valve and/or metal dusting of valve control means for controlling said valve, can be counteracted.

The waste heat boiler system of the invention can thus be protected relatively well, in a relatively elegant manner, from control valve failures and/or mixing chamber failures due to corrosion by carburization or metal dusting which is known to affect relatively hot bypass channels and mixing chambers of conventional waste heat boiler systems.

Advantageously, the invention provides a heat exchanger system that may be optimized in terms of heat transfer area by performing the required cooling of process gas in two steps, i.e. in two or more shells in series. Both can thus be optimized for specific temperature levels. Thus, it allows for optimization of the total heat transfer surface through utilization of different tube diameters and lengths in each compartment, thereby reducing the total surface required and thereby reducing the amount of steel.

In embodiments of the system of the present invention, at least a distal end portion of the pre-cooled, warm gas bypass channel of the waste heat boiler system is formed by a sleeve extending into the interior of the mixing chamber, wherein an inner wall surface of the mixing chamber is spaced apart from an outer wall surface of said sleeve. As a result, the relatively warm gas flowing through said sleeve can for instance disperse some of its warmth, through the wall of said sleeve, to gas having a lower temperature, which gas is located between the outer wall surface of said sleeve and the inner wall surface of the mixing chamber, e.g. the relatively cool gas entering the mixing chamber and/or gas already mixed in the mixing chamber. Consequently, the relatively warm gas can be pre-cooled even further before it can contact the inner wall of the mixing chamber. Additionally or alternatively, the sleeve may direct the relatively warm gas in a certain direction into the mixing chamber, e.g. in a direction substantially coaxial to a longitudinal direction of the mixing chamber, which may counteract that the relatively warm gas can be mixed with the relatively cool gas at least to some extend before it can contact the inner wall of the mixing chamber. Hence, metal dusting of a gas mixing chamber may be counteracted even further.

For example, the mixing chamber can be of substantially elongated design, and the sleeve or the end portion thereof extending into said mixing chamber, can extend substantially coaxially with said mixing chamber.

Advantageously, the mixing chamber can further be provided with an inlet which is fluidly connected to the second heat exchanger, wherein said inlet is located substantially laterally aside of the sleeve, such that during use of the waste heat boiler system at least a portion, and preferably substantially all, of the relatively cool gas coming out of the tubes of the second shell-and-tube heat exchanger enters the mixing chamber at a location substantially laterally aside of said sleeve. As a result, a relatively large part of the gas being present at the outside of the sleeve can be formed by relatively cool gas fed from the second shell-and-tube heat exchanger into the mixing chamber, in stead of being formed by mixed gas of which the temperature is less below the temperature of the relatively warm gas. Besides, introducing at least a part of the relatively cool gas coming from the second heat exchanger into a space between the inner wall surface of the mixing chamber and the outer wall surface of the sleeve extending into the mixing chamber can facilitate that the gas in said space, which gas can be warmed up by the gas flowing through the sleeve, will be refreshed, and/or can counteract that warmed up gas will stand in said space.

Advantageously, said sleeve extending into the interior of the mixing chamber, or at least a part thereof, especially a distal end portion extending into the interior of the mixing chamber, can be replaceable mounted in the mixing chamber. Therefore, replacing said sleeve, which may wear faster than the interior wall of the mixing chamber, can be removed relatively easily, e.g. without needing to remove the whole or a relatively large part of the mixing chamber, for instance in order to inspect, maintain, or replace said sleeve or part thereof.

In embodiments, the first shell-and-tube heat exchanger, the intermediate chamber, and the second shell-and-tube heat exchanger can all be located in a main body of the waste heat boiler system, especially a vessel shaped main body, whereas the mixing chamber can then be located outside of said main body. By locating the mixing chamber outside the main body of the waste heat boiler system, said mixing chamber, or one or more parts thereof or associated therewith, such as for instance a sleeve extending into the mixing chamber interior, can for instance be inspected, replaced, maintained, cleaned, or refurbished relatively easily.

It is noted that locating the mixing chamber outside the waste heat boiler main body may also allow for improved mixing of process gas in a compact volume, while preventing excessive mechanical stress by an improved flow distribution. The location of the mixing chamber outside the main body can allow for prevention of metal dusting in the waste heat boiler system.

Additionally or alternatively, the mixing chamber, or at least its outer wall, which may be formed at least partly by a vessel-like body, may be replaceable mounted in the waste heat boiler system, e.g. in order to facilitate maintenance thereof.

By arranging that the bypass channel is an external channel, e.g. an external pipe, located outside of the shell of the second shell-and-tube heat exchanger, and especially by locating said external channel substantially completely outside of the main body of the waste heat boiler, the bypass channel can be accessible relatively well, which can facilitate that it can for example be inspected, maintained, cleaned, replaced or refurbished in a relatively easy manner.

The external bypass channel located outside the waste heat boiler main body can facilitate that the design is simpler and/or that the shell diameter is smaller than in case of a conventional bypass channel extending through a heat exchanger and in parallel to the tubes of the heat exchanger. Furthermore, providing the bypass channel outside the main body can reduce differences between tubes expansion and shell expansion, which are proportional to the length of the tube-and-shell heat exchanger. Hence, tube sheet failures due to mechanical stress caused by the differential expansion can be counteracted.

However, in alternative embodiments, the bypass channel can be an internal channel extending at least partly through the space within the shell of the second shell-and-tube heat exchanger, e.g. in order to facilitate a relatively compact design of the waste heat boiler system. In such case, the internal bypass channel can be provided with an internal bypass valve.

The present disclosure also relates to an advantageous mixing chamber for mixing relatively warm gas with relatively cool gas. Said mixing chamber, comprising an inlet sleeve for relatively warm gas, wherein said sleeve extends into the interior of the mixing chamber, wherein an inner wall surface of the mixing chamber is spaced apart from an outer wall surface of said sleeve, wherein the mixing chamber is provided with an inlet for allowing relatively cool gas to enter the mixing chamber, and wherein said inlet is located substantially laterally aside of said sleeve.

It is noted that said advantageous mixing chamber does not need to be incorporated in an embodiment of the inventive waste heat boiler system described above. It is noted that this advantageous mixing chamber can for instance thus also be advantageously used in another waste heat boiler system for cooling a process gas, e.g. a waste heat boiler system lacking a bypass from an intermediate chamber towards a mixing chamber, such as for example in a waste heat boiler system having a bypass to feed a portion of relatively hot gas, e.g. having a temperature of 500° C.-1,000° C., directly into the mixing chamber, i.e. without pre-cooling said portion of gas.

Moreover, the disclosure relates to a method for cooling a process gas. Said method comprises a step of providing a relatively hot process gas, and a step of cooling said relatively hot process gas down to relatively warm gas by means of a first heat exchanger, preferably a shell-and-tube heat exchanger. The method further comprises a step of cooling a first portion of said relatively warm gas further down, i.e. cooling it down to relatively cool gas, by means of a second heat exchanger, preferably a second shell-and-tube heat exchanger. Furthermore, the method comprises the steps of bypassing a second portion of the relatively warm gas along said second heat exchanger; and mixing said relatively cool gas and said bypassed portion of the relatively warm gas together into a mixed gas. Advantageously, the method may also comprise a step of adjusting the flow of the bypassed, second portion of the relatively warm gas to control the temperature of the mixed gas, preferably in order to obtain a mixed gas of substantially a predetermined temperature, e.g. a predetermined temperature corresponding to a desired input temperature of a downstream gas treatment unit.

BRIEF DESCRIPTION OF THE DRAWINGS

By way of non-limiting examples only, embodiments of the present invention will now be described with reference to the accompanying figures in which.

DESCRIPTION OF PREFERRED EMBODIMENTS

It is noted that the figures show merely preferred embodiments according to the invention, and that the figures are provided by way of examples only and should be understood as such. In the figures, the same or similar reference signs or numbers refer to equal or corresponding parts.

Figure 1:
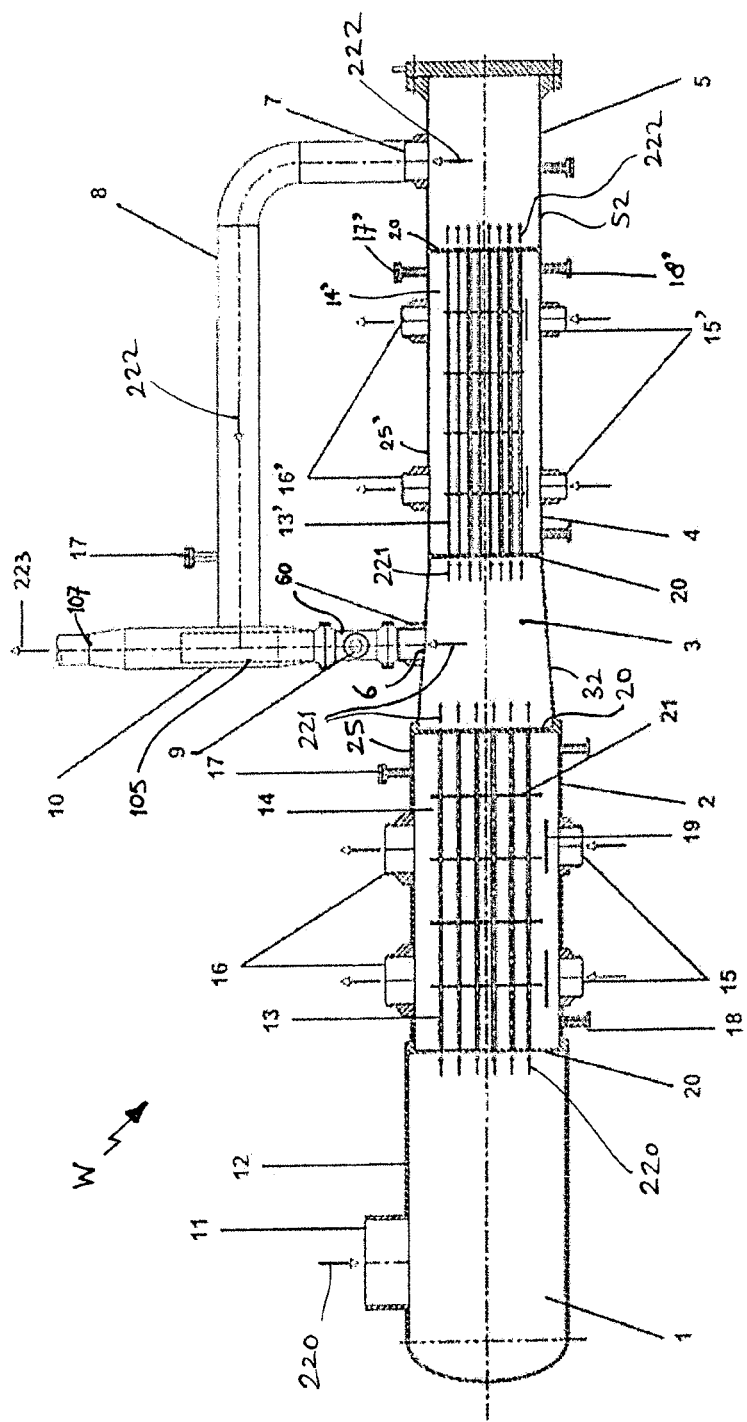
FIG. 1 shows a schematic cross-sectional view of an embodiment of a waste heat boiler system according to an aspect of the invention.

FIG. 1 shows a schematic cross-sectional view of an embodiment of a waste heat boiler system W according to an aspect of the invention.

The waste heat boiler system W according to the invention can be arranged to be used for cooling process gas 220, e.g. in a plant that produces hydrogen or syngas, e.g. for industrial hydrogen production, methanol production, ammonia production, dimethyl ether production, etc. It is noted that the relatively hot process gas 220 to be cooled by the waste heat boiler system W, which gas during use passing through the waste heat boiler system W, may for example originate from a steam reformer, an autothermal reformer, a regenerative reformer, or a partial oxidation unit.

For instance, the relatively hot gas 220 to be cooled by the waste heat boiler system W may initially be at a temperature of at least 500° C., preferably at least 650° C., especially at least 700° C. Additionally or alternatively, the temperature of said relatively hot gas can be at most 1,200° C., preferably at most 1,100° C., such as at most 1,000° C.

During use, the gas to be cooled down may be cooled down by the waste heat boiler system W to a temperature less than 350° C., e.g. for gas treatment at a location downstream of the waste heat boiler system W. Such gas treatment may for instance be or comprise catalytic treatment such as water gas shift treatment or separation by membranes, by scrubbing or by pressure swing adsorption. It is noted that the temperature of gas 223 coming from waste heat boiler W may for instance be critical for safe and suitable operation of a respective downstream unit and/or for the controlled generation of steam. For instance therefore, it can be desired to control the temperature of output gas relatively well.

As can be seen in FIG. 1, the present waste heat boiler system W for cooling a process gas comprises a first heat exchanger 2 of the shell-and-tube type. Said first shell-and-tube heat exchanger 2 is for cooling relatively hot gas 220 down to relatively warm gas 221 by allowing gas to flow through tubes 13 of said first heat exchanger 2, wherein said tubes 13 extend through a space 14 within a shell 25 of said first heat exchanger 2.

Advantageously, the waste heat boiler system W can also comprise an inlet chamber 1 in fluid connection with the upstream ends of the tubes 13 of the first heat exchanger 2, which chamber 1 can further comprise an inlet 11 for allowing the relatively hot gas to enter the inlet chamber 1, and to enter the waste heat boiler system W in case the inlet chamber 1 is the most upstream part of the waste heat boiler system W. A wall or shell 12 defining the inlet chamber 1, which can e.g. be made from steel or another metal or alloy, may preferably be lined with refractory in order to prevent the material of said wall or shell 12 to some extent from exposure to excessive temperature and stress due to high temperature of the inlet gas. The inlet chamber 1 may be provided with multiple outlets for allowing the relatively hot gas 220 to flow from said chamber 1 into respective tubes 13 of the first heat exchanger 2.

During use of the waste heat boiler system W, relatively hot process gas flowing through the tubes 13 of the first heat exchanger 2 where heat can be transferred to a cooling fluid, such as water, that flows throughout the space 14 defined by the shell 25 and which cooling fluid contacts the outer surface of said tubes 13.

The waste heat boiler system W also comprises an intermediate chamber 3 for receiving gas, cooled down to relatively warm gas 221, coming out of the tubes 13 of the first heat exchanger 2.

Further, the waste heat boiler system W comprises a second shell-and-tube heat exchanger 4, which is for cooling relatively warm gas 221 further down to relatively cool gas 222 by allowing gas to flow from the intermediate chamber 3 and through tubes 13' of the second heat exchanger 4, which tubes 13' extend through a space 14' within a shell 25' of said second heat exchanger 4.

In the respective shell-and-tube heat exchanger 2; 4, cooling fluid, e.g. water, can enter the respective shell 25; 25' through one or more inlets 15; 15', which can be connected to so-called downcomers, and can exit said shell 25; 25' through one more outlets 16; 16', which may be connected to so-called risers. For instance because cooling liquid absorbing heat from the gas to be cooled can at least partly, and preferably substantially completely, turn into gas, e.g. steam, the one or more outlets 16; 16' may be located at a top side of the respective shell 25; 25'. Additionally, the one or more inlets 15; 15' may be located at a substantially opposite side, e.g. at or near a lower side, of said shell 25; 25'.

Advantageously, the shell 25 may be equipped with one or multiple vents 17; 17', e.g. in order to prevent steam blanketing of for example uppermost ones of the tubes 13; 13' of the respective shell-and-tube heat exchanger 2; 4.

Advantageously, one or more boiler system blowdown outlets 18; 18' may be provided, e.g. at a lower side of the shell 25; 25' of the respective heat exchanger 2; 4, in order to allow to intentionally waste some cooling liquid, e.g. water, from the space 14; 14' in said shell 25; 25' in order to counteract a relatively high concentration or accumulation of impurities such as solids, e.g. during continuing evaporation of steam. Said boiler system blowdown outlets 18; 18' can for instance be formed by or as flanged connections and may facilitate an intermittent blowdown system to remove any accumulated solids from the respective shell interior.

The intermediate chamber 3 is provided with an outlet 6 which is fluidly connected to a bypass channel 60 for allowing a part of the relatively warm gas 221 entering said intermediate chamber 3 from the tubes 13 of the first heat exchanger 2 to bypass the tubes 13' of the second shell-and-tube heat exchanger 4. Both the bypass channel 60 and the tubes 13' of the second shell-and-tube heat exchanger 4 are in fluid connection with a mixing chamber 10 for mixing together relatively warm gas 221 flowed from the intermediate chamber 3 into the mixing chamber 10 via the bypass channel 60 and relatively cool gas 222 come out of the tubes 13' of the second shell-and-tube heat exchanger 4.

Hence, the temperature of the relatively cool gas 222 coming from the second heat exchanger 4 can be raised to some extend by mixing it with the relatively warm gas 221, in stead of mixing it by relatively hot gas 220 as is done in prior art waste heat boiler systems. As a result, it be counteracted that the mixing chamber 10 will be exposed to gasses of relatively hot temperatures, e.g. temperatures above 500° C., e.g. temperatures between 700° C. and 1,000° C.

It is noted that the tubes 13' of the second shell-and-tube heat exchanger 4 may deliver the relatively cool gas 222 for instance into an output chamber 5, and that said output chamber 5 can for instance be fluidly connected with the mixing chamber 10 via a connecting channel 8 connecting an outlet 7 of the output chamber 5 with an inlet 101 of the mixing chamber 10.

Moreover, it is noted that the first shell-and-tube heat exchanger 4, the intermediate chamber 3 and the second shell-and-tube heat exchanger 4 can be provided in a waste heat boiler main body, especially a vessel shaped main body. Advantageously, as can be seen in the exemplary embodiment of FIG. 1, the waste heat boiler main body may in embodiments also comprise the inlet chamber 1 and/or the outlet chamber 5. The outer wall or shell of the waste heat boiler main body 12, 25, 32, 25', 52, can advantageously be formed at least partly by the shell 25 of the first heat exchanger 2, an outer wall 32 of the intermediate chamber 3, and the shell 25' of the second heat exchanger 4. Additionally, outer walls 12, 52 of the inlet chamber 1 and/or the outlet chamber 5 may for instance define parts of the waste heat boiler main body 12, 25, 32, 25', 52.

Advantageously, the bypass channel 60 can be provided with a control valve 9 or so-called bypass valve 9 for controlling the flow of relatively warm gas 221 bypassing the tubes 13' of the second heat exchanger 4. Hence, said valve 9 can be used to adjust the flow rate of said portion of relatively warm process gas exiting the intermediate chamber 3 via the bypass channel 60, allowing for temperature control of the outlet gas 223 of the waste heat boiler system W.

By placing said bypass valve 9 outside of the intermediate chamber 3 and/or outside the main body of the system, the bypass valve 9 can be relatively easily accessible for maintenance purposes.

Although the bypass channel 60 can preferably be formed as an external channel, e.g. an external pipe, provided outside of the shell 25' of the second shell-and-tube heat exchanger 4, and preferably outside of the waste heat boiler main body 12, 25, 32, 25', 52, the bypass channel may in alternative embodiments be formed as an internal channel extending at least partly through the space 14' within the shell 25' of the second shell-and-tube heat exchanger 4, e.g. in order to facilitate a relatively compact design of the waste heat boiler system W. In such latter case, such internal channel can be relatively wide with respect to a single tube 13' of the second shell-and-tube heat exchanger 4, and/or said internal channel can be thermally insulated relatively well with respect to the tubes 13' of the second shell-and-tube heat exchanger 4, i.e. said tube 13' being thermally conductive relatively well with respect to said internal channel.

In preferred embodiments, the mixing chamber 10 can be located outside of the waste heat boiler main body 12, 25, 32, 25', 52. However, in alternative embodiments, the mixing chamber 10 may be located inside the waste heat boiler main body 12, 25, 32, 25', 52. For example, the mixing chamber 10 can be located inside, and/or can be formed by, the outlet chamber 5, e.g. when the bypass channel is formed as an internal bypass channel extending through the second shell-and-tube heat exchanger 4.

With respect to the shell-and-tube heat exchangers 2; 4, it is noted that, in embodiments, the heat exchangers 2; 4 can be provided with tubesheets 20 which can form a border between the respective heat exchangers 2; 4 and a respective downstream chamber 1; 3 or a respective upstream chamber 3; 5. The tubesheets 20 can be provided with holes connected the respective chamber 1; 3; 5 with respective tubes 13; 13' to allow gas to flow from the respective chamber into said tubes or from said tubes into the respective chamber, respectively.

The tubes can be connected tightly to the respective chamber by means of the respective tubesheet 20. Additionally, the tubes may be supported by support plates 21 or so-called baffles 21 provided within the respective heat exchanger 2; 4. Advantageously, flowing cooling liquid can be distributed substantially equally in the axial direction of the shell-and-tube heat exchanger by means of said baffles or support plates 21 and/or by means of flow distribution plates 19 or other type of devices 19 arranged for optimal flow distribution throughout the shell 25; 25' of the respective heat exchanger.

Although the second shell-and-tube heat exchanger 4 may be of substantially the same design as the first shell-and-tube heat exchanger 2, and although both heat exchangers 2; 4 may substantially be equipped with the same features 25; 25', 13; 13', 15; 15', 16; 16', 17; 17', 18; 18', 19; 19', 20, the dimensions of both heat exchangers 2; 4 may differ from each other. For example, the length and/or the diameter of the shell and/or the length, diameter and/or number of the tubes may be different. Since gas flowing through the second shell-and-tube heat exchanger is of a lower temperature, the cross-sectional surface area of the tubes 13' of the second heat exchanger and thus the diameter of the second heat exchanger may be relatively small with respect to the first heat exchanger. Additionally or alternatively, the baffle design may be different.

Besides, it is noted that although the tubes are of substantially straight design in the exemplary embodiment shown in FIG. 1, the tubes may of another design, e.g. a U-shaped design. Alternatively or additionally, the baffles 21, which are in the exemplary embodiment designed to allow water to flow substantially transverse to the tubes, e.g. substantially upwards, may be of different design in alternative embodiments. For example, the baffles may be placed such that they define a serpentine path, e.g. of a one-pass straight-tube heat exchanger, e.g. allowing the cooling liquid, preferably water, to flow substantially in the opposite direction of the gas flowing through the tubes.

The system comprises a first and a second shell-and-tube heat exchanger. Each shell-and-tube heat exchanger typically comprises at least one shell and multiple tubes. Commonly, the shell and tubes of the first heat exchanger are separated from the shell and tubes of the second heat exchanger by the intermediate chamber. The first heat exchanger is generally located substantially longitudinally aside of the second heat exchanger, in particular in a direction longitudinal of the tubes. Thus, the second heat exchanger lies adjacent to the first heat exchanger in a longitudinal direction of the tubes of the first heat exchanger, separated from each other by the intermediate chamber (and optionally the tubesheets if present).

Figure 2:
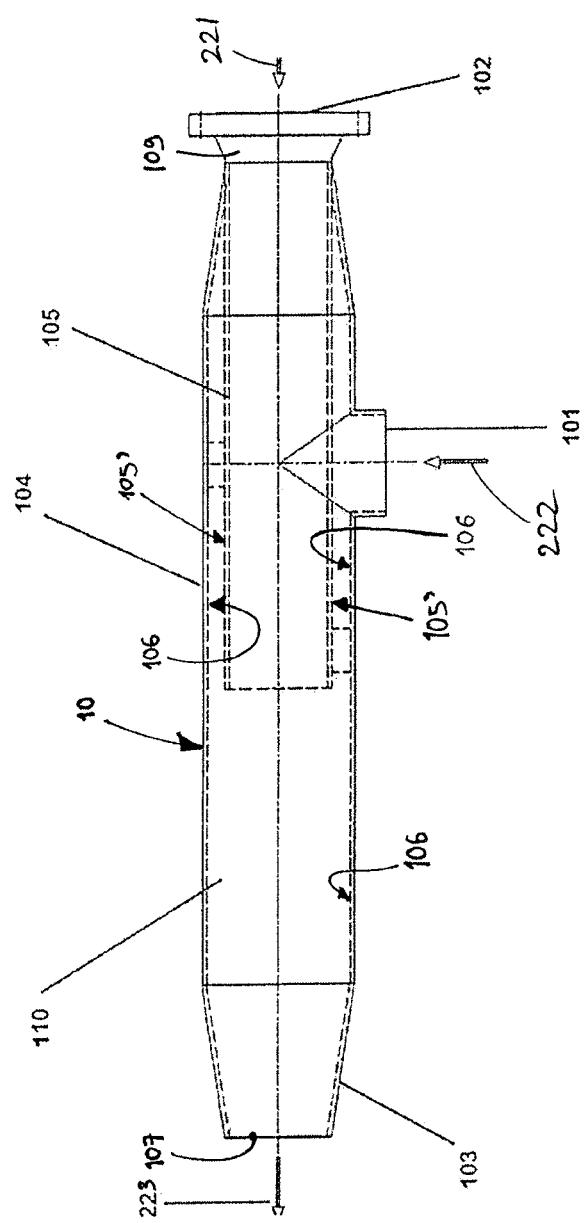
FIG. 2 shows a schematic cross-sectional view of an embodiment of an advantageous mixing chamber according to an aspect of the invention.
Figure 3:
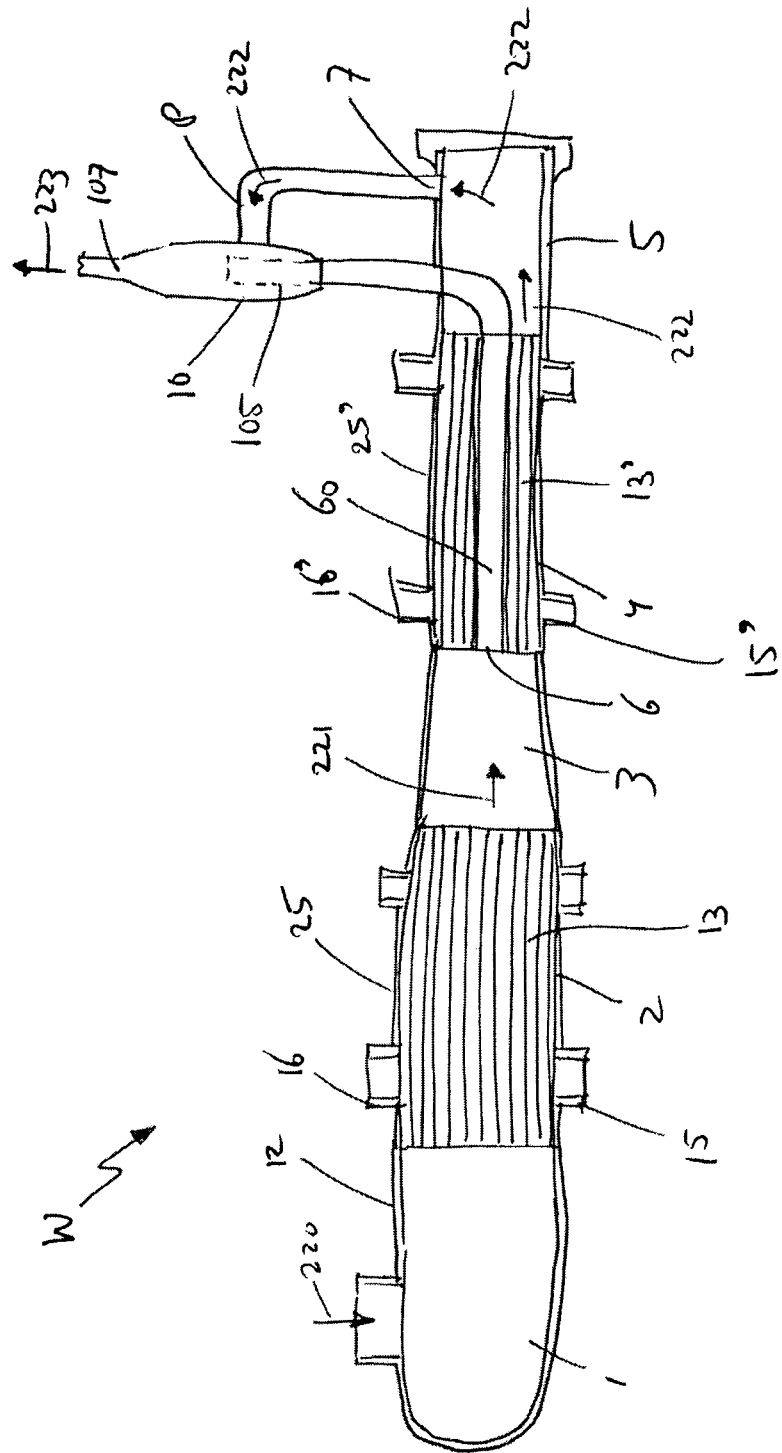
FIG. 3 illustrates an internal bypass channel of an embodiment according to an aspect of the disclosure.

As best can be seen in FIG. 2, which shows a mixing chamber 10 corresponding to the mixing chamber 10 of the waste heat boiler system W of FIG. 1, in embodiments of a waste heat boiler system W according to the invention, the mixing chamber 10 can be formed as a mixing tee 10.

Preferably, the mixing chamber 10 is of such design that relatively warm gas 221 enters the mixing chamber 10 through a reducing piece 109 having a reduced diameter with respect to the bypass channel 60 and/or with respect to the mixing chamber 10. Hence, relatively warm gas 221 flowing from said bypass channel 60 into the mixing chamber 10 can be blown into the mixing chamber 10 relatively centrally, thereby counteracting that it directly contacts the wall of the mixing chamber 10, and thereby thus counteracting mechanical-imposed material stresses in the mixing chamber 10, e.g. due to temperature differences.

Additionally or alternatively, at least a distal end portion of the bypass channel 60 can be formed by a sleeve 105 extending into the interior 110 of the mixing chamber 10. An inner wall surface 106 of the mixing chamber 10 can then be spaced apart from an outer wall surface 105' of said sleeve 105. As a result, the relatively warm gas 221, coming from the intermediate chamber 3, and flowing through said sleeve 105, can disperse some of its warmth through the wall of said sleeve 105, to gas having a lower temperature, which gas is located between the outer wall surface 105' of said sleeve 105 and the inner wall surface 106 of the mixing chamber 10. As a consequence, the relatively warm gas 221 coming from the intermediate chamber 3 can be pre-cooled even further before it can contact the inner wall 106 of the mixing chamber 10. Hence, metal dusting of the mixing chamber 10 may be counteracted to a relatively large extent.

The diameter of the sleeve 105 and/or the distance between said sleeve 105 and the inner wall 106 of the mixing chamber 10 can be chosen such that can be counteracted that relatively warm gas 221 flowing out of said sleeve 105 contacts the mixing chamber wall material before being mixed with the relatively cool gas 222, thereby counteracting stress of the mixing chamber wall material. The relatively warm gas 221 can thus be concentrated in the center of the mixing chamber 10 and can undergo mixing and heat exchange with the relatively cool process gas 222, which preferably flows substantially coaxially. The fine tuning of the diameter of the mixing chamber and the velocity of both relatively warm process gas and relatively cool process gas may allow for the mixing of the gas in a relatively small sized mixing chamber, while still enabling avoiding excessive stresses on the mixing chamber material.

Preferably, the diameter of the sleeve 105 and the diameter of the wall of the mixing chamber 10 are selected such that the relatively warm process gas flow can be mixed relatively homogeneously with the relatively cool process gas before it leaves the mixing chamber 10, e.g. via a reducing piece 103 near the end of the mixing chamber.

Advantageously, the mixing chamber 10 can be provided with an inlet 102 fluidly connected to the second shell-and-tube heat exchanger 4, said inlet 102 being located substantially laterally aside of the sleeve 105, such that during use of the waste heat boiler system W at least a portion, and preferably all, of the relatively cool gas 222 coming out of the tubes 13' of the second shell-and-tube heat exchanger 4 enters the mixing chamber 10 at a location substantially laterally aside of said sleeve 105. As a result, the temperature of a portion of gas present in the mixing chamber 10 and outside of the sleeve 105 can be relatively cool and/or said portion of gas can be refreshed relatively easily.

It is noted that although such mixing chamber 10 can advantageously be used in an embodiment of the waste heat boiler system W according to an aspect of the present invention, the mixing chamber 10 can also be advantageously utilized in alternative systems. The present invention also relates to such a mixing chamber 10 when it is not included in a waste heat boiler system W having a bypass channel 60 for letting a portion of relatively warm gas 221 which is pre-cooled by a first shell-and-tube heat exchanger 2 bypass a second shell-and-tube heat exchanger 4 in order to use said portion of still relatively warm gas to mix with relatively cool gas coming from the second shell-and-tube heat exchanger 4 to enable controlling the gas temperature of output gas 223 of the waste heat boiler system W.

This is, the present invention also relates to a mixing chamber 10 as such, which mixing chamber 10 is arranged for mixing relatively warm gas, or even relatively hot gas, with relatively cool gas, wherein the mixing chamber 10 comprises an inlet sleeve 105 for relatively warm or relatively hot gas, said sleeve 105 extending into the interior 110 of the mixing chamber 10, wherein an inner wall surface 106 of the mixing chamber 10 is spaced apart from an outer wall surface 105' of said sleeve 105, wherein the mixing chamber 10 is provided with an inlet 101 for allowing relatively cool gas to enter the mixing chamber 10, wherein said inlet 101 is located substantially laterally aside of said sleeve.

As can be seen in the figures, the mixing chamber 10 may be of substantially elongated design. Advantageously, the sleeve 105 or at least an end portion thereof extending into said mixing chamber 10 can be extending substantially coaxially with said mixing chamber 10, e.g. with a wall circumscribing the interior 110 of the mixing chamber 10.

Additionally or alternatively, an end portion 103 of the mixing chamber 10, preferably of an substantially elongated mixing chamber, can be provided with an outlet 107 for allowing gas 223 mixed together in said mixing chamber 10 to flow out of said mixing chamber 10, wherein the surface area covered by a cross-section of said end portion 103 of the mixing chamber 10 is reducing towards said outlet 107, preferably in a substantially gradual manner. It is noted that the end portion 103 can thus be formed as a reducing piece 103.

In embodiments, the mixing chamber 10 can comprise an outer wall that has an inner diameter that is fixed as a function of both the mass flow of the relatively warm gas and the mass flow of the relatively cool process gas and as a function of the input velocities of both said gasses and the output velocity of the final mixed gas. The diameter of the mixing chamber 10 can be selected such that flow distribution in said mixing chamber 10 is relatively homogenized, e.g. in order to prevent excessive stress on the material.

Although this advantageous mixing chamber 10 can for instance be used in an embodiment of the waste heat boiler system W having a bypass channel 60 bypassing the second shell-and-tube heat exchanger 4 as described above, the mixing chamber 10 can, as is mentioned before, can also be utilized in another waste heat boiler system. For example, the inlet 101 for relatively cool gas can then be in fluid connection with gas outlets formed by ends of tubes of a shell-and-tube heat exchanger of such alternative waste heat boiler system, and the inlet sleeve 105 for relatively warm gas or for relatively hot gas can then for instance be in fluid connection with an inlet chamber provided upstream of said shell-and-tube heat exchanger of said alternative waste heat boiler system by means of a bypass channel. Preferably, said bypass channel may be provided with a control valve, more preferably a high temperature resistant control valve, as said bypass channel can in such embodiments of the mixing chamber 10 receive relatively hot gas, e.g. of a temperature above 500° C., above 650° C., or even above 700° C., which is not pre-cooled. In embodiments, the mixing chamber 10 can for instance thus be advantageously used in a waste heat boiler system having a single shell-and-tube heat exchanger and/or in a waste heat boiler system having multiple shell-and-tube heat exchangers in which the bypass channel bypasses all of the shell-and-tube heat exchangers of said system.

It is noted that, especially in such embodiments, the bypass channel and/or the sleeve 105 can preferably be lined with refractory in view of the relatively high temperature of the bypassed gas fed into the mixing chamber 10.

A waste heat boiler system is designed to withstand high temperature and high pressure, which are typically encountered in the cooling of process gas. Accordingly, the inlet for providing the system with process gas (e.g. inlet 11) is commonly refractory lined, as the process gas entering the system is typically between 700 and 950° C.

The tubes and/or tubesheets are designed to allow them to accommodate large temperature differences. Preferably, the tubes and/or tube sheets are thin and to some extent flexible. The thin tube sheet design is based on the theory of flexible membrane which is held in place by the tubes whereby the tubes must be in tension. From a mechanical point of view, the pressure in the tubes (i.e. the process gas side) is preferably lower than the pressure in the shell (i.e. the water side) of the heat exchanger. High pressure on the inner surface of the tubes would bring the tubes in compression (eventually in eccentric compression), which would lead to an undesirable amount of stress on the tubes. The pressure at the process gas side, the pressure at the water side and the pressure difference between the two may be as described above for the waste heat boiler applications in general.

The first shell-and-tube heat exchanger, the intermediate chamber, and the second shell-and-tube heat exchanger can all be located in a main body of the waste heat boiler system, especially a vessel shaped main body. The vessel shaped main body is preferably of substantially elongated design. Such a design is suitable for withstanding high pressures and high temperatures typically encountered in the cooling of process gas. Also, it will provide for an acceptable and gradual distribution of heat throughout the system.

In case of an elongated design, the first heat exchanger is generally located substantially longitudinally aside of the second heat exchanger. Accordingly, the second heat exchanger generally lies adjacent to the first heat exchanger in a longitudinal direction of the elongated main body, with the exchangers being separated from each other by the intermediate chamber (and optionally the tubesheets if present). Thus, the intermediate chamber is typically positioned in the middle portion of the elongated main body, with the first heat exchanger located at one side of the intermediate chamber towards one end of the elongated main body and the second heat exchanger located at the other side of the intermediate chamber towards the other end of the elongated main body. Such a design also provides for easy maintenance as the coolest parts of the waste heat boiler, in particular the output chamber and/or mixing chamber, are well accessible. It is usually recognized in the art that potassium leached from the reforming catalyst contributes to corrosion of tubes in the coolest part of the conventional waste heat boiler.

Preferably, each of the first and second shell-and-tube heat exchanger is provided with at least two tube sheets. A tube sheet is typically provided on both ends of the heat exchanger. Thus, the first and second heat exchanger essentially make up two separate compartments. This design has the advantage of reduced stresses induced by differential tube expansion, especially compared to a design with a single heat exchanger or single shell. The flexibility of having two separate tube-and-shell heat exchangers allows for high cooling duty.

In an aspect, the invention also relates to a method for cooling a process gas, which method preferably can be performed by means of a waste heat boiler system W according to another aspect of the invention.

In this method, a relatively hot process gas 220, for instance at a temperature above 500° C., preferably above 650° C., especially at or above 700° C., can be provided. Said relatively hot process gas 220 can for example originate from a steam reformer, an autothermal reformer, a regenerative reformer, or a partial oxidation unit. In a second step, said relatively hot process gas 220 is cooled down to relatively warm gas 221, for instance relatively warm gas 221 of 550° C. or less, especially 500° C. or less, e.g. by means of a first heat exchanger 2, preferably a shell-and-tube heat exchanger 2, such as for instance a heat exchanger 2 being part of a heat waste boiler system W as described above.

The process gas passing through the waste heat boiler system is generally fed to the waste heat boiler system at a relatively high pressure, e.g. between 5 and 60 bar, commonly between 10 and 50 bar, such as 20 and 35 bar.

In a third step, a first portion or first fraction of said relatively warm gas 221 is cooled down further by means of a second heat exchanger, preferably a second shell-and-tube heat exchanger 4, such as for instance a heat exchanger 4 being part of a heat waste boiler system W as described above. For example, it is cooled down to relatively cool gas 222, for instance gas 222 having a temperature of 400° C. or less, especially 350° C. or less.

A second portion or second fraction of the relatively warm gas 221 is bypassed along said second heat exchanger 4.

Furthermore, the method comprises a step of mixing said relatively cool gas 222 and said bypassed portion of the relatively warm gas 221 together into a mixed gas 223, preferably at a location outside the main body of the waste heat boiler.

Advantageously, the method can comprise a further step of adjusting the flow of the bypassed, second portion of the relatively warm gas, e.g. by means of a control valve 9, in order to control the temperature of the mixed gas 223, preferably in order to obtain a mixed gas of substantially a predetermined temperature.

It is noted that the method may further comprise steps of sensing the temperature of the output gas 223, sensing the temperature of the relatively hot gas 220, sensing the temperature of the relatively cool gas 222, and/or sensing the temperature of the relatively warm gas, 221 and/or steps of sensing the flow rate or rates of one or more of the respective gas flows, e.g. a mass flow of the respective gas, in order to control the temperature of the output gas 223, e.g. by controlling or adjusting the control valve 9 at least partly based on one or more of such sensed parameters and/or a desired output gas temperature. For instance thereto, the waste heat boiler system W may be provided with one or more controllers and/or sensors. Besides, the bypass valve 9 may be equipped with an actuator, and preferably also a positioner and/or a position sensor, for controlling the bypass valve position in order to allow a controlled amount of the relatively warm gas 221 exiting the intermediate chamber 3 to flow into the mixing chamber 10.

In a preferred embodiment, the regulated flow rate of the bypassed relatively warm gas can be dependent upon the measured temperature from the relatively cool gas 222 fed to the mixing chamber 10, e.g. through the connecting channel 8.

It is noted that for the purpose of clarity and a concise description features are described herein as part of the same or separate embodiments, however, it will be appreciated that the scope of the invention may include embodiments having combinations of all or some of the features described.

In the present disclosure all combination of parts of the disclosed embodiments are considered also to have been disclosed. For example, parts only explicitly described as part of a waste heat boiler system having a bypass channel extending from an intermediate chamber between two shell-and-tube heat exchangers towards said mixing chamber, are thus also disclosed in the present disclosure as part of a mixing chamber as such, which mixing chamber is not necessarily used and/or to be used in such a waste heat boiler system.

Further, it is noted that the invention is not restricted to the embodiments described herein. It will be understood that many variants are possible.

For example, the system may comprise multiple first shell-and-tube heat exchangers, wherein additional intermediate chambers can be provided between adjacent ones of said multiple first shell-and-tube heat exchangers. Additionally or alternatively, the system may comprise multiple second shell-and-tube heat exchangers, wherein additional intermediate chambers can be provided between adjacent ones of said multiple second shell-and-tube heat exchangers. One or multiple bypass channels can then be arranged to bypass relatively warm gas from one or multiple of said intermediate chambers, e.g. at least from an intermediate chamber provided between the or the last first heat exchanger and the or the first second heat exchanger, towards the mixing chamber. Providing multiple first and/or multiple second heat exchangers can for instance overcome tube and/or shell length limitations. The differential growth between shell and tubes may then greatly be reduced and relatively large boiler systems can then be built without excessive mechanical stress on the respective heat exchanger.

As another example, the heat exchangers of the system may have a tube-sheet peripheral configuration, e.g. comprising knuckles, but may alternatively have a stiffened peripheral configuration, e.g. lacking such knuckles.

Such and other variants will be apparent for the person skilled in the art and are considered to lie within the scope of the invention as formulated in the following claims.

The invention claimed is:

1. A waste heat boiler system for cooling a process gas, the waste heat boiler system comprising:

a first shell-and-tube heat exchanger for cooling relatively hot gas down to relatively warm gas by allowing gas to flow through tubes of said first heat exchanger, which first tubes extend through a space within a shell of said first heat exchanger;

an intermediate chamber for receiving gas, cooled down to relatively warm gas, coming out of the tubes of the first heat exchanger;

a second shell-and-tube heat exchanger for cooling relatively warm gas further down to relatively cool gas by allowing gas to flow from the intermediate chamber and through second tubes of the second heat exchanger, which second tubes extend through a space within a shell of said second heat exchanger; and an output chamber for receiving gas, cooled down to relatively cool gas, coming out of the tubes of the second heat exchanger, wherein the intermediate chamber comprises a first outlet fluidly connected to a bypass channel for allowing a part of the relatively warm gas entering said intermediate chamber from the first tubes to bypass the second tubes, wherein the output chamber comprises a second outlet, wherein both the bypass channel and the second outlet are in fluid connection with a mixing chamber for mixing together relatively warm gas flowed from the intermediate chamber into the mixing chamber via the bypass channel and relatively cool gas flowed from the output chamber into the mixing chamber via the second outlet.

2. The waste heat boiler system according to claim 1, wherein the first shell-and-tube heat exchanger, the intermediate chamber and the second shell-and-tube heat exchanger are located in a main body of elongated design,
wherein the second heat exchanger is located substantially longitudinally aside of the first heat exchanger.

3. The waste heat boiler system according to claim 1, wherein the bypass channel comprises a control valve for controlling the flow of relatively warm gas bypassing the second tubes of the second heat exchanger.

4. The waste heat boiler system according to claim 1, wherein at least a distal end portion of the bypass channel is formed by a sleeve extending into the interior of the mixing chamber, and
wherein an inner wall surface of the mixing chamber is spaced apart from an outer wall surface of said sleeve.

5. The waste heat boiler system according to claim 4, wherein the mixing chamber comprises an inlet fluidly connected to the second shell-and-tube heat exchanger, said inlet being located substantially laterally aside of the sleeve, such that during use of the waste heat boiler system at least a portion of the relatively cool gas coming out of the second tubes enters the mixing chamber at a location substantially laterally aside of said sleeve.

6. The waste heat boiler system according to claim 4, wherein the mixing chamber is of substantially elongated design, and
wherein the sleeve or the end portion thereof extending into said mixing chamber is extending substantially coaxially with said mixing chamber.

7. The waste heat boiler system according to claim 1, wherein an end portion of the mixing chamber comprises a third outlet for allowing gas mixed together in the mixing chamber to flow out of said mixing chamber, and
wherein the surface area covered by a cross-section of said end portion of the mixing chamber is reducing towards said third outlet.

8. The waste heat boiler system according to claim 1, wherein the first shell-and-tube heat exchanger, the intermediate chamber and the second shell-and-tube heat exchanger are located in a main body, wherein the mixing chamber is located outside of said main body.

9. The waste heat boiler system according to claim 1, wherein the bypass channel is an external channel provided outside of the shell of the second shell-and-tube heat exchanger.

10. The waste heat boiler system according to claim 1, wherein the bypass channel is an internal channel extending through the space within the shell of the second shell-and-tube heat exchanger.

11. The waste heat boiler system according to claim 10, wherein said internal channel is relatively wide with respect to a tube of the second shell-and-tube heat exchanger, and/or
wherein said internal channel is thermally insulated relatively well with respect to a tube of the second shell-and-tube heat exchanger, and said tube of the second shell-and-tube heat exchanger being thermally conductive relatively well with respect to said internal channel.

12. The waste heat boiler system according to claim 1, wherein the mixing chamber comprises an inlet sleeve for relatively warm or relatively hot gas, said sleeve extending into the interior of the mixing chamber,
wherein an inner wall surface of the mixing chamber is spaced apart from an outer wall surface of said sleeve,
wherein the mixing chamber comprises an inlet for allowing relatively cool gas to enter the mixing chamber,
wherein said inlet is located substantially laterally aside of said sleeve.

13. The waste heat boiler system according to claim 12, wherein the mixing chamber is a substantially elongated mixing chamber, and
wherein the sleeve or an end portion thereof extends substantially coaxially with said substantially elongated mixing chamber.

14. The waste heat boiler system according to claim 12, wherein the inlet for relatively cool gas is in fluid connection with the second outlet, and
wherein the inlet sleeve for relatively warm gas is in fluid connection with the inlet chamber provided upstream of said second shell-and-tube heat exchanger via a bypass channel.

15. The waste heat boiler system according to claim 7, wherein the surface area covered by a cross-section of said end portion of the mixing chamber is reducing toward the third outlet in a substantially gradual manner.

16. The waste heat boiler system according to claim 9, wherein the first shell-and-tube heat exchanger, the intermediate chamber and the second shell- and-tube heat exchanger are located in a main body, and
wherein the bypass channel is outside of said main body.

17. The waste heat boiler system according to claim 14, wherein said bypass channel is provided with a control valve.

18. A waste heat boiler system for cooling a process gas comprising:
a first shell-and-tube heat exchanger configured to cool relatively hot gas down to relatively warm gas, the first shell-and-tube heat exchanger comprising a shell and tubes extending through a space within the shell, the tubes configured to allow gas to flow therethrough;
an intermediate chamber for receiving gas, cooled down to relatively warm gas, coming out of the tubes of the first heat exchanger; and
a second shell-and-tube heat exchanger configured to cool relatively warm gas further down to relatively cool gas, the second shell-and-tube heat exchanger comprising a shell and tubes extending through a space withing the shell, the tubes configured to allow gas to flow therethrough from the intermediate chamber, wherein the intermediate chamber comprises an outlet fluidly connected to a bypass channel configured to allow a part of the relatively warm gas entering said intermediate chamber from the tubes of the first heat exchanger to bypass the tubes of the second shell-and-tube heat exchanger;

wherein both the bypass channel and the tubes of the second shell-and-tube heat exchanger are in fluid communication with a mixing chamber for mixing together relatively warm gas flowed from the intermediate chamber into the mixing chamber via the bypass channel and relatively cool gas coming out of the tubes of the second shell-and-tube heat exchanger, wherein the first shell-and-tube heat exchanger, the intermediate chamber, and the second shell-and-tube heat exchanger are all located in a main body of the waste heat boiler system, whereas the mixing chamber is located outside of said main body, wherein the cooling fluid used to cool the gas in the second heat exchanger is not subsequently fed into the first heat exchanger.

19. The waste heat boiler system according to claim 18, wherein the main body is a vessel shaped main body.

20. A waste heat boiler system for cooling a process gas, comprising:

a first shell-and-tube heat exchanger configured to cool relatively hot gas down to relatively warm gas, the first shell-and-tube heat exchanger comprising a shell and tubes extending through a space within the shell, the tubes configured to allow gas to flow therethrough;

an intermediate chamber configured to receive gas cooled down to relatively warm gas, coming out of the tubes of the first heat exchanger; and a second shell-and-tube heat exchanger configured to cool relatively warm gas further down to relatively cool gas, the second shell-and-tube heat exchanger comprising a shell and tubes extending through a space within the shell, the tubes configured to allow gas to flow therethrough from the intermediate chamber, wherein the intermediate chamber comprises an outlet fluidly connected to a bypass channel for allowing a part of the relatively warm gas entering said intermediate chamber from the tubes of the first heat exchanger to bypass the tubes of the second shell-and-tube heat exchanger, wherein both the bypass channel and the tubes of the second shell-and-tube heat exchanger are in fluid connection with a mixing chamber for mixing together relatively warm gas flowed from the intermediate chamber into the mixing chamber via the bypass channel and relatively cool gas coming out of the tubes of the second shell-and-tube heat exchanger, wherein the first shell-and-tube heat exchanger comprises:

one or more first cooling fluid inlets configured to allow a first cooling fluid to enter the a shell of the first shell-and-tube heat exchanger, and one or more first cooling fluid outlets configured to allow a second cooling fluid to exit the shell of the first shell-and-tube heat exchanger;

wherein the second shell-and-tube heat exchanger comprises:

one or more second cooling fluid inlets configured to allow a second cooling fluid to enter the shell of the first shell-and-tube heat exchanger, and one or more second cooling fluid outlets configured to allow the second cooling fluid to exit the shell of the second shell-and-tube heat exchanger;

wherein none of the one or more second cooling fluid outlets is fluidly connected to one or more of the one or more first cooling fluid inlets of the first shell-and-tube heat exchanger.

* * * * *